United States Patent
Kraus

(10) Patent No.: US 10,458,558 B2
(45) Date of Patent: Oct. 29, 2019

(54) VALVE, CONTAINER FOR RECEIVING AND/OR MIXING FLUIDS, USE OF A CONTAINER AND METHOD FOR RECEIVING AND/OR MIXING FLUIDS

(71) Applicant: KAO GERMANY GMBH, Darmstadt (DE)

(72) Inventor: Sebastian Kraus, Darmstadt (DE)

(73) Assignee: KAO GERMANY GMBH, Darmstadt (DE)

( * ) Notice: Subject to any disclaimer, the term of this patent is extended or adjusted under 35 U.S.C. 154(b) by 212 days.

(21) Appl. No.: 15/523,895

(22) PCT Filed: Nov. 3, 2015

(86) PCT No.: PCT/EP2015/075528
§ 371 (c)(1),
(2) Date: May 2, 2017

(87) PCT Pub. No.: WO2016/074982
PCT Pub. Date: May 19, 2016

(65) Prior Publication Data
US 2018/0003309 A1    Jan. 4, 2018

(30) Foreign Application Priority Data
Nov. 11, 2014  (EP) .................................... 14192711

(51) Int. Cl.
*F16K 15/14* (2006.01)
*F16K 7/17* (2006.01)

(52) U.S. Cl.
CPC .............. *F16K 15/144* (2013.01); *F16K 7/17* (2013.01)

(58) Field of Classification Search
CPC ............................. F16K 15/144; F16K 15/145
(Continued)

(56) References Cited

U.S. PATENT DOCUMENTS 2,758,609 A * 8/1956 Dickert ................. F16K 15/144
137/512
3,270,771 A * 9/1966 Morgan ................ F16K 15/144
137/859
(Continued)

FOREIGN PATENT DOCUMENTS

EP    2 702 893 A1    3/2014
EP    2 711 596 A1    3/2014

OTHER PUBLICATIONS

International Search Report dated Jan. 12, 2016, dated Jan. 20, 2016.

*Primary Examiner* — David L Sorkin
(74) *Attorney, Agent, or Firm* — Norris McLaughlin, P.A.

(57) ABSTRACT

It is provided a valve, particularly for a bowl and/or a bottle for receiving and/or mixing fluids, comprising a vent for injecting a fluid, wherein the vent comprises an inlet connected to a discharge opening via a discharge channel, a flexible diaphragm for covering the discharge opening of the vent, wherein the flexible diaphragm comprises a holding collar for receiving a measuring cylinder, particularly in a press-fitted manner, and a fastening means for loss-proof receiving the flexible diaphragm between the fastening means and the vent, wherein the fastening means is releasably connected to the vent, wherein the vent comprises a support collar supporting the holding collar, wherein the holding collar comprises a sealing rim protruding mainly radially outwards, wherein the sealing rim is arranged between the fastening means and the support collar and is in sealing contact to the fastening means.

14 Claims, 2 Drawing Sheets

Figure 1:
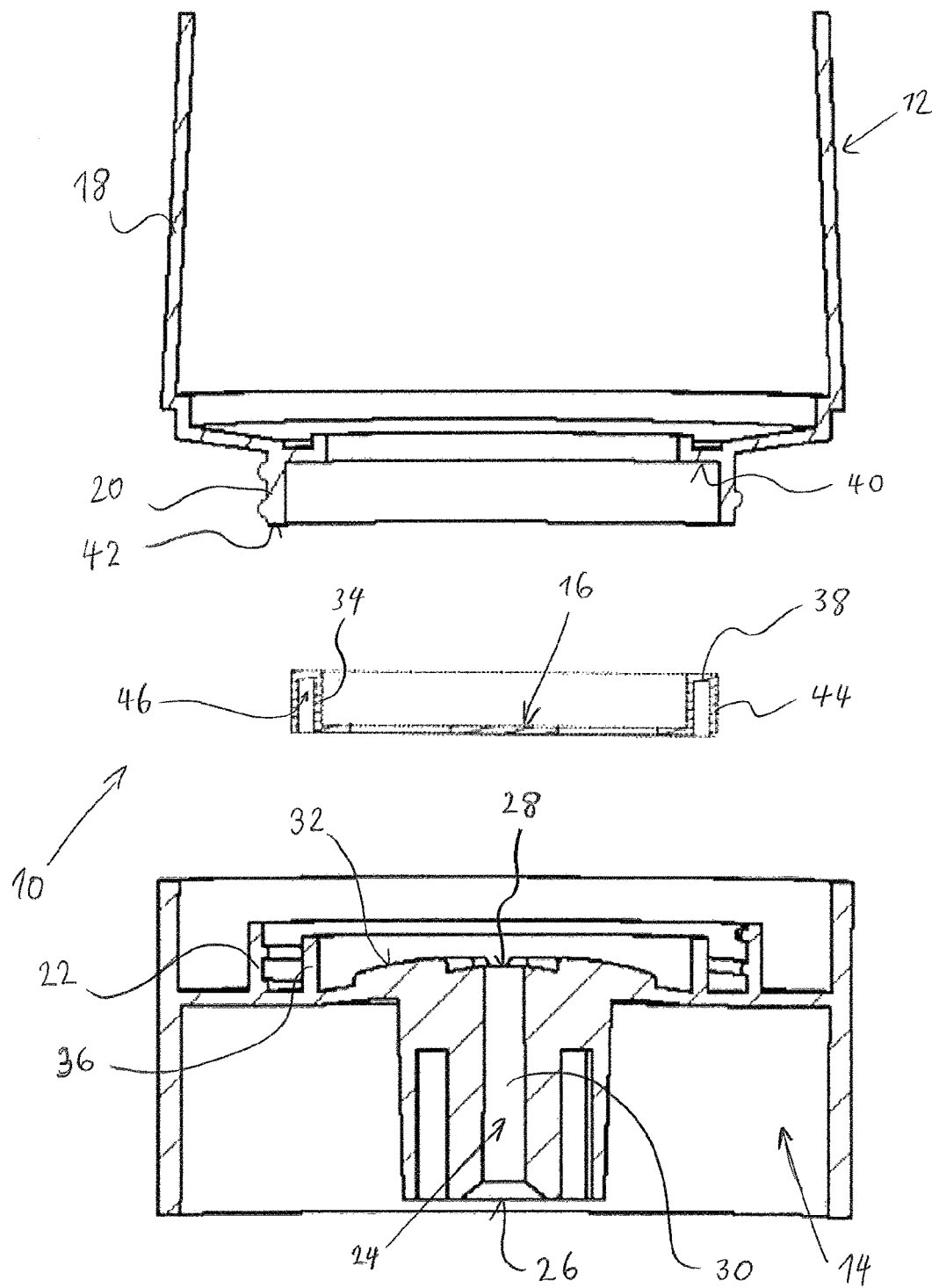

(58) Field of Classification Search
USPC .......................................................... 137/859
See application file for complete search history.

(56) References Cited

U.S. PATENT DOCUMENTS

| | | | | |
|---|---|---|---|---|
| 4,712,583 | A * | 12/1987 | Pelmulder | A61M 39/24 137/494 |
| 6,089,272 | A * | 7/2000 | Brand | A61M 39/24 137/852 |
| 8,251,099 | B2 * | 8/2012 | Carmody | A61M 39/24 137/852 |
| 8,291,936 | B2 * | 10/2012 | Carmody | A61M 39/24 137/512.1 |
| 2004/0178230 | A1 | 9/2004 | Feierabend | |
| 2009/0014077 | A1 * | 1/2009 | Kuhnle | F16K 7/17 137/625.27 |
| 2012/0055555 | A1 * | 3/2012 | Saint-Paul | F16K 7/14 137/1 |
| 2015/0352349 | A1 * | 12/2015 | Carmody | A61M 5/165 137/544 |

* cited by examiner

VALVE, CONTAINER FOR RECEIVING AND/OR MIXING FLUIDS, USE OF A CONTAINER AND METHOD FOR RECEIVING AND/OR MIXING FLUIDS This application is the U.S. National Stage of International Application No. PCT/EP2015/075528, filed Nov. 3, 2015, which claims foreign priority benefit under 35 U.S.C. § 119 of European Application No. 14192711.1 filed Nov. 11, 2014.

DESCRIPTION

The invention relates to a valve particularly for injecting a fluid into a container, a container for receiving and/or mixing fluids, a use of a container by means of which a specific amount particularly of a hair tinting means can be easily injected into a container as well as a method for receiving and/or mixing fluids.

From EP 2 711 596 A1 a unidirectional valve for a bowl is known, wherein a discharge opening of a vent is covered by flexible diaphragm which is bonded to a vessel body of the bowl. The flexible diaphragm comprises a holding collar for receiving a measuring cylinder wherein the holding collar is supported by the rigid material of the vessel body.

There is a permanent need reducing maintenance costs of a container used for receiving and/or mixing fluids, particularly cosmetic products like hair tinting means.

It is the object of the invention providing measures enabling a container used for receiving and/or mixing fluids, particularly cosmetic products like hair tinting means, with low maintenance costs. Further it may be an object facilitating the handling, particularly the usage and/or the cleaning, of the container for a user.

The solution of this object is provided according to the invention set forth herein, a container is disclosed herein, a use of such kind of a container is disclosed herein, and a method is also disclosed herein. Preferred embodiments of the invention are further disclosed herein, which can constitute each solely or in combination an aspect of the invention.

An aspect of the invention is directed to a valve, particularly for a bowl and/or a bottle for receiving and/or mixing fluids, comprising a vent for injecting a fluid, wherein the vent comprises an inlet connected to a discharge opening via a discharge channel, a flexible diaphragm for covering the discharge opening of the vent, wherein the flexible diaphragm comprises a holding collar for receiving a measuring cylinder, particularly in a press-fitted manner, and a fastening means for loss-proof receiving the flexible diaphragm between the fastening means and the vent, wherein the fastening means is releasably connected to the vent, wherein the vent comprises a support collar supporting the holding collar, wherein the holding collar comprises a sealing rim protruding mainly radially outwards, wherein the sealing rim is arranged between the fastening means and the support collar and is in sealing contact to the fastening means.

Grooves may occur in a transition region between the flexible diaphragm and the fastening means and/or the vent in the assembled state of the valve, where a fluid may remain after use of the valve, particularly after filling a fluid into a container, particularly a bowl and/or a bottle, via the valve. Since the flexible diaphragm is not fixed to another part but can be detached as a whole from the valve each part of the valve can be cleaned independently from each other. During a cleaning of the valve in a disassembled state the grooves in a transition region between the flexible diaphragm and the fastening means and/or the vent are not present anymore so that even these grooves can be cleaned well. Particularly each separate part of the valve, namely the vent, the flexible diaphragm and the fastening means, may be designed in a way that cavities, sharp edges or undercuts may be prevented so that areas which are difficult to clean may be omitted. The cleaning of a container adapted for receiving and/or mixing fluids comprising such kind of a valve may be facilitated. Since the cleaning of the parts of the valve is facilitated an unnecessary soiling and/or a fast aging of the respective part can be prevented. Further it is possible replacing the flexible diaphragm easily without replacing the vent or the fastening means leading to low costs for keeping the valve in function. Since the flexible diaphragm is not fixed to another part but can be detached as a whole from the valve, each part of the valve can be cleaned and/or replaced well independently from each other in disassembled state of the valve without remaining grooves in transition region between the flexible diaphragm and the fastening means and/or the vent occurring in the assembled state of the valve so that due to a good cleaning the life time of the parts of the valve is increased and it is enabled a container used for receiving and/or mixing fluids, particularly cosmetic products like hair tinting means, comprising such kind of a valve with low maintenance costs.

In addition by means of the easily cleanable and/or replaceable diaphragm the handling, particularly the usage and/or the cleaning, of the container is facilitated for a user.

The fastening means may be part of a container, particularly a bowl and/or a bottle, so that the container may be connected to the vent via the fastening means. When a measuring cylinder is inserted into the holding collar of the flexible diaphragm occurring forces, particularly during the insertion of the measuring cylinder, may be borne by the support collar of the vent. The support collar may bear forces directed in radial direction when the measuring cylinder is inserted into the holding collar in a press-fitted manner. Particularly the vent has to stand the pressure of an aerosol can and/or of a pump dispenser connected to the inlet for injecting a fluid so that the vent is usually made from a sufficient rigid material with is hard enough for bearing the load provided by the measuring cylinder, wherein the diaphragm is adapted to be lifted up by the pressure of the aerosol can so that the fluid of the aerosol can may pass the diaphragm. Further the diaphragm may be elastic enough to be stretched over the vent without a significant loss of its flexibility. Since the fastening means does not have to bear the load of the measuring cylinder the fastening means could be designed less rigid than the vent and more cost efficient. The movement of the flexible diaphragm in radial direction of the holding collar is limited by the support collar abutting the holding collar. The movement of the flexible diaphragm in axial direction of the holding collar is limited by the vent axially downwards and limited by the fastening means axially upwards. The sealing rim of the flexible diaphragm may meet the vent or the fastening means when moved in axial direction. Therefore, the flexible diaphragm is loss-proof received between the fastening means and the vent without the need of being clamped between the fastening means and the vent. It is not necessary to fix the flexible diaphragm to the vent or to the fastening means. Due to the sealing contact of the flexible diaphragm to the fastening means a use volume above the vent can be sufficiently sealed. The flexible diaphragm provides not only a seal for the discharge opening but may also seal the fastening means towards the vent. The valve may be further designed as explained in EP 2 711 596 A1 which is herewith referenced as being part of the invention.

The vent and the diaphragm may constitute a unidirectional valve. The diaphragm is particularly made from an elastomeric material. Particularly the diaphragm contacts the vent such that the diaphragm covers the material of the vent forming the discharge opening. The discharge opening may be closed by a closing area of the flexible diaphragm. The diaphragm may contact the vent along a circumferential line and/or at least a main part of a tip area of the vent pointing away from the inlet. When no pressure is applied the diaphragm may close the vent via the closing area. The vent may press a part of the diaphragm upwards so that the diaphragm may be elastically deformed by the vent. When a sufficient pressure is present in the valve, particularly when the content of an aerosol can and/or of a pump dispenser is injected into the vent, the diaphragm may open the vent, for instance by being lifted from the vent. In the lifted position of the flexible diaphragm the fluid inside the discharge channel may leave the discharge opening of the vent and may pass the flexible diaphragm via windows provided in the material of the flexible diaphragm between the closing area and the holding collar. The bended diaphragm may provide a spring force which provides at least a part of a closing force for closing the discharge opening of the vent by means of the diaphragm. A minimum closing force of the diaphragm to the vent may be ensured. When the valve is part of a container providing a vessel for receiving a fluid an increasing filling level of a fluid inside the vessel increases the closing force and the sealing effect of the diaphragm. Particularly the inlet of the vent may be designed for being put onto the outlet stem of an aerosol can and/or of a pump dispenser.

Preferably the diaphragm is made from flexible material particularly TPE, TPS, TPE-O, TPO, thermoplastic elastomer based on polyolefines, PP/EPDM, TPV, rubber or silicone.

Particularly the vent and/or the fastening means is made from a thermoplastic material, particularly SAN or PP. Suitable TPE are styrenic block copolymers, polyolefin blends, elastomeric alloys (TPE-v or TPV), thermoplastic polyurethanes, thermoplastic copolyester or thermoplastic polyamides. Particularly suitable are thermoplastic Elastomer based on olefins (TPO), cross-linked and/or vulcanized thermoplastic Elastomer based on olefins (TPV) or styrol block copolymers (TPS), like SBS, SEBS, SEPS, SEEPS or MBS. The vent may be made from a thermoplastic material, particularly styrene-acrylonitrile resin (SAN) or polypropylene (PP), particularly clear and/or transparent PP. Due to the thermoplastic material of the vent the vent may be harder than the diaphragm. Due to the flexible material of the diaphragm it is possible that the holding collar may receive the measuring cylinder without clearance. Particularly preferred the holding collar is adapted for releasably receiving the measuring cylinder. Particularly it is possible providing a holding force between the measuring cylinder and the holding collar so that the measuring cylinder may not easily fall apart. In addition the diaphragm itself may provide a sealing by means of the holding collar so that a fluid filled into the measuring cylinder via the valve may not escape the measuring cylinder. The measurement of the amount, particularly a filled volume, of a fluid may be measured by means of the measuring cylinder with a high accuracy. After filling a defined amount of a fluid into the measuring cylinder the fluid may be filled into a container, wherein particularly the valve is already a part of a container so that it is sufficient to detach the measuring cylinder from the holding collar of the diaphragm for filling the content of the measuring cylinder into the container. Since the holding collar of the diaphragm may hold and seal the measuring cylinder safely it is not necessary providing additional holding or sealing means made from a separate flexible material at the measuring cylinder. O-rings made from a flexible material and provided at the outer circumference of the measuring cylinder can be saved. Correspondingly it is not necessary providing additional holding or sealing means made from a separate flexible material at a container or something else comprising such kind of a valve in order to receive the measuring cylinder in a press-fitted manner. Due to the holding collar provided by the diaphragm itself a secure releasably receipt of the measuring cylinder in a sealed manner can be provided without the need of additional sealing means enabling a facilitated injection of a specific amount of a fluid into a container adapted for receiving and/or mixing fluids.

Directions and/or relative arrangements like "up", "down", "high", "low", "below", "above", "vertical", "horizontal" and the like are understood as directions and/or relative arrangements with respect to gravity direction in a situation, when the inlet of the valve or a container comprising the valve is placed onto a horizontal ground. Particularly the discharge channel of the valve is aligned mainly in vertical direction in the intended use position.

Particularly the sealing rim provides a spring force for being pressed against the fastening means. Due to the spring force the sealing effect of the flexible diaphragm towards the fastening means is increased. When the fastening means is connected to the vent, the fastening means may bend the sealing rim loading a spring force.

Preferably the fastening means comprises a stop face abutting the vent at a relative position where the fastening means is arranged spaced to the support collar in axial direction of the support collar. A gap between the fastening means and the support collar in axial direction may be larger than the thickness of the sealing rim in axial direction. Due to the stop the sealing rim is not clamped between the fastening means and the vent. A damaging of the soft material of the flexible diaphragm by the rigid material of the vent and the fastening means can be prevented.

Particularly preferred the fastening means comprises a sealing surface pointing to an axial front face of the support collar, wherein the sealing rim of the flexible diaphragm contacts the sealing surface. A sufficient sealing effect between the sealing rim and the sealing surface of the fastening means can be easily provided by connecting the fastening means to the vent. Particularly the sealing rim may contact the sealing surface of the fastening means not only via a contact line, but via a contact area so that a high sealing effect can be provided. Particularly a required sealing effect may be easily adjusted by providing an appropriate radial extension of the sealing rim of the flexible diaphragm and of the corresponding sealing surface of the fastening means.

Particularly the flexible diaphragm comprises an outer collar protruding from the sealing rim towards the vent, wherein the holding collar, the sealing rim and the outer collar constitutes a mainly ring shaped pocket into which the support collar of the vent is inserted. When the support collar is inserted into the pocket the friction between the flexible diaphragm and the support collar may be such high that the flexible diaphragm fall not apart from the vent, particularly even when the vent is positioned upside down. Even when the flexible diaphragm is bended in a way that a part of the holding collar is not in contact with the support collar the opposite part of the outer collar may contact the support collar with a sufficient friction force.

Preferably the vent comprises a fastening element releasably connected to the fastening means, particularly by means of a screw connection or a snap connection, wherein the fastening means is radially spaced to the flexible diaphragm at least over the height of the support collar. When the fastening means is connected to the fastening element of the vent it is prevented that the fastening means slides on the material of the flexible diaphragm during the relative movement. Unnecessary wear can be prevented leading to a high life time.

Particularly preferred the holding collar of the flexible diaphragm is releasably press-fitted inserted into the support collar. Due to the press fit between the holding collar and the support collar a friction can be provided which keeps the flexible diaphragm in place relative to the vent. The friction may be such high that the flexible diaphragm fall not apart from the vent, particularly even when the vent is positioned upside down. At the same time the friction is low enough for detaching the flexible diaphragm from the vent by hand.

Particularly the vent comprises a, particularly convex, bottom forming the discharge opening, wherein the flexible diaphragm is pressed between the fastening means and the bottom. The fastening means may press the flexible diaphragm downwards against the bottom of the vent so that the flexible diaphragm may be positioned in a predefined relative position to the bottom. Due to a convex form of the bottom the flexible diaphragm may be pressed against the discharge opening of the discharge channel of the vent so that a necessary minimum pressure inside the discharge channel can be defined at which the discharge channel can be opened by lifting the flexible diaphragm from the discharge opening.

A further aspect of the invention is directed to a container, particularly a bowl and/or a bottle, for receiving and/or mixing fluids, particularly a hair tinting means, comprising a vessel for receiving and/or mixing the fluids, the vessel comprising a rigid vessel body for bordering a use volume, a stand adapted to be placed below the vessel for placing the vessel onto a ground and a valve which may be designed as previously described for injecting a fluid into a measuring cylinder and/or into the use volume. Since the flexible diaphragm of the valve is not fixed to another part but can be detached as a whole from the container, each part of the container can be cleaned and/or replaced well independently from each other in disassembled state of the container without remaining grooves in transition region between the flexible diaphragm and the fastening means and/or the vent of the valve occurring in the assembled state of the valve so that due to a good cleaning the life time of the parts of the container is increased and it is enabled a container used for receiving and/or mixing fluids, particularly cosmetic products like hair tinting means, with low maintenance costs.

Due to the valve a fluid may be filled into the measuring cylinder from below. The vessel body may comprise a bottom opening closed by the diaphragm so that the fluid can be injected into the use volume from below. After a specific amount of the fluid is injected into the measuring cylinder via the valve, the measuring cylinder can be detached so that the fluid located inside the measuring cylinder may flow automatically into the vessel of the container.

Not until the measuring cylinder is detached the fluid comes into contact with the vessel body. After the measuring cylinder is detached the filled fluid may be mixed, particularly with further different fluids, and/or applied. Due to the holding collar provided by the diaphragm itself a secure releasably receipt of the measuring cylinder in a sealed manner can be provided without the need of additional sealing means enabling a facilitated injection of a specific amount of a fluid into a container adapted for receiving and/or mixing fluids.

The use volume is a volume inside the vessel which can be filled with a fluid, when the container is placed onto a horizontal ground. The use volume is bordered at the bottom be means of the diaphragm and, if so, by a part of the vessel body and/or the fastening means. The use volume is bordered sideways mainly by the vessel body and/or the fastening means, particularly by the vessel body only. The use volume is accessible from above, particularly for inserting a tool, for instance a brush, for mixing a fluid inside the use volume and/or for collecting at least a part of the filled fluid for applying the fluid. Particularly a brush is used for mixing a filled mixture of a paste-like or liquid fluid and/or mixing two or more fluids for providing a hair tinting means of a particular color, wherein the mixed hair tinting means may be applied to human hair by means of the same brush. Preferably the same brush is used for cleaning the vessel and/or the stand after use.

A pressurized fluid of an aerosol can and/or of a pump dispenser, particularly a hair tinting means, may be easily injected into the use volume of the vessel via the valve. The lowest part of the vent may be higher than a rest surface of the stand for contacting the ground when the container is placed onto a ground. The stand may surround and cover an upper part of the aerosol can and/or the pump dispenser so that leaking content, particularly aerosol, may be collected by the stand and may not soil other parts outside the container. Further the stand can be safely placed in a correct alignment onto an upper part of the aerosol can and/or the pump dispenser so that an outlet stem of the aerosol can and/or the pump dispenser may not be damaged by the stand.

The vessel body is harder compared to the diaphragm. This means the vessel body is inflexible compared to the diaphragm. However, the vessel body may be made from a plastic material which allows a slight bending of the rigid vessel body. The wording "rigid" is understood such that in contrast to the flexible diaphragm a bending of the vessel body is not intended so that the vessel body is made from a different harder material than the material used for the diaphragm. Particularly the vessel body may comprise a measuring scale for measuring the volume of fluids filled in the vessel. This facilitates the receiving of an intended amount of the fluid and/or mixing of a mixture with predefined ratios of the used components.

Particularly the fastening means is one-piece with the vessel body and/or the vent is one-piece with the stand. The number of assembling parts is low facilitating the assembling, detaching and cleaning of the container. Particularly the container consists of three different parts, namely the stand comprising the vent, the flexible diaphragm and the vessel comprising the fastening means. Since the vent of the valve is not a part of the vessel but part of the stand, the diaphragm may provide a flexible bottom of the vessel covering the other parts of the valve. Cavities, sharp edges or undercuts at the vessel may be prevented so that areas which are difficult to clean may be omitted. Particularly the vessel body and the diaphragm may provide a mainly smooth bordering for the use volume.

Preferably the measuring cylinder is received by the holding collar, particularly in a press-fitted manner. Preferably the measuring cylinder is releasably received by the holding collar. The measurement of the amount, particularly a filled volume, of a fluid may be measured by means of the measuring cylinder with a high accuracy. When the measuring cylinder is detached the fluid flows into the vessel and can be easily mixed and/or applied.

Preferably the measuring cylinder is made one-piece particularly from a plastic material like SAN or PP. This means no additional flexible material is provided at the measuring cylinder. The measuring cylinder does not have to be provided with sealing means. This leads to a simple design of the measuring cylinder and a facilitated manufacturing of the measuring cylinder. Particularly the material of the measuring cylinder is at least partially mainly transparent or translucent. The measuring cylinder can be provided with a scale so that the volume of the fluid filled into the measuring cylinder can be easily measured by determining the filling level of the measuring cylinder be means of the scale watching the outside of measuring cylinder.

Particularly preferred the measuring cylinder comprises a stepped course in axial direction, wherein particularly the outer circumference of the measuring cylinder narrows inside the holding collar in an axial direction pointing towards the vent. Preferably the measuring cylinder may be designed at least at a part like a funnel. The funnel-like shape of the measuring cylinder facilitates the insertion of the measuring cylinder into the holding collar of the diaphragm and may provide a first rough centering of the measuring cylinder. Particularly preferred the inner circumference of the holding collar is shaped correspondingly to the particularly funnel-like shape of the measuring cylinder so that in assembled state, when the measuring cylinder is inserted into the holding collar and received by the holding collar, a contact between the holding collar and the measuring cylinder is possible at the narrow part as well as the broad part of the holding collar. Particularly the measuring cylinder may comprise a circumferential chamfer at its front end pointing towards the discharge channel. Due to the chamfer the inserting and centering of the measuring cylinder is facilitated. Further a free space in the corner region between the holding collar and the connecting area of the diaphragm can be provided so that elastically deformed parts of the diaphragm can be pressed into the free space without blocking the insertion of the measuring cylinder into the holding collar.

A further aspect of the invention is directed to a use of a container, particularly a bowl and/or a bottle, which may be designed as previously described for receiving and/or mixing fluids, particularly a hair tinting means. Since the flexible diaphragm of the valve is not fixed to another part but can be detached as a whole from the container, each part of the container can be cleaned and/or replaced well independently from each other in disassembled state of the container without remaining grooves in transition region between the flexible diaphragm and the fastening means and/or the vent of the valve occurring in the assembled state of the valve so that due to a good cleaning the life time of the parts of the container is increased and it is enabled a container used for receiving and/or mixing fluids, particularly cosmetic products like hair tinting means, with low maintenance costs.

A further aspect of the invention is directed to a method for receiving and/or mixing fluids, particularly a hair tinting means, comprising the steps of providing a container which may be designed as previously described, wherein the vessel is connected with the stand, connecting the vent of the stand with a discharge stem of an aerosol can and/or a pump dispenser, subsequently injecting a fluid of the aerosol can and/or the pump dispenser into the vessel via the valve of the container, subsequently mixing and/or applying the at least one fluid located inside the vessel, subsequently detaching the vessel from the stand and detaching the flexible diaphragm from the vessel and the stand and subsequently cleaning the vessel, the flexible diaphragm and the stand separately from each other. Since the flexible diaphragm of the valve is not fixed to another part but can be detached as a whole from the container, each part of the container can be cleaned and/or replaced well independently from each other in disassembled state of the container without remaining grooves in transition region between the flexible diaphragm and the fastening means and/or the vent of the valve occurring in the assembled state of the valve so that due to a good cleaning the life time of the parts of the container is increased and it is enabled a container used for receiving and/or mixing fluids, particularly cosmetic products like hair tinting means, with low maintenance costs.

Particularly the vessel, the flexible diaphragm and the stand are cleaned at different times and/or different places. Since the container can be cleaned in a state when the vessel and/or the flexible diaphragm is separated from the stand each part can be cleaned independently from the other. Particularly a cleaning of surfaces between the vessel and the stand is enabled or at least facilitated. Even more the flexible diaphragm can be cleaned from all sides so that particularly grooves in a transition region between the flexible diaphragm and the vessel and/or the stand can be cleaned well.

Preferably the vessel and/or the stand and/or the flexible diaphragm are cleaned by brushing and/or rinsing. The rinsing may be performed by using water particularly in the case of water soluble fluids and/or by using a suitable solvent particularly in the case of lipophilic fluids. Since the vessel and/or the stand and/or the flexible diaphragm may provide mainly smooth surfaces without sharp edges or undercuts or grooves in transition regions between each other a facilitated cleaning by brushing and/or rinsing with water leads to good cleaning results. Particularly a brush is used which is also used for mixing and/or applying the fluids so that the brush itself can be cleaned at the same time.

Particularly the vessel is connected with the stand after cleaning the vessel and/or the stand, wherein the flexible diaphragm is loss-proof positioned between the vessel and the stand. In cleaned state the vessel and the stand may be connected with each other so that the container is prepared for the next use. Particularly the vessel and the stand are connected with each other in dry state particularly when the vessel, the flexible diaphragm and the stand are dried after a cleaning by rinsing.

Figure 2:
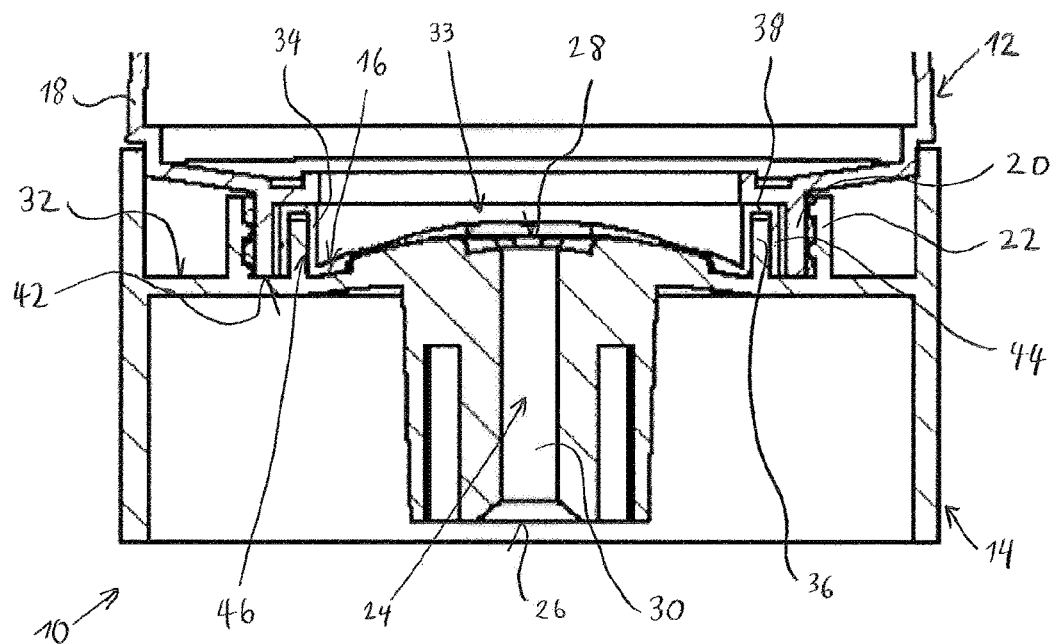
Figure 3:
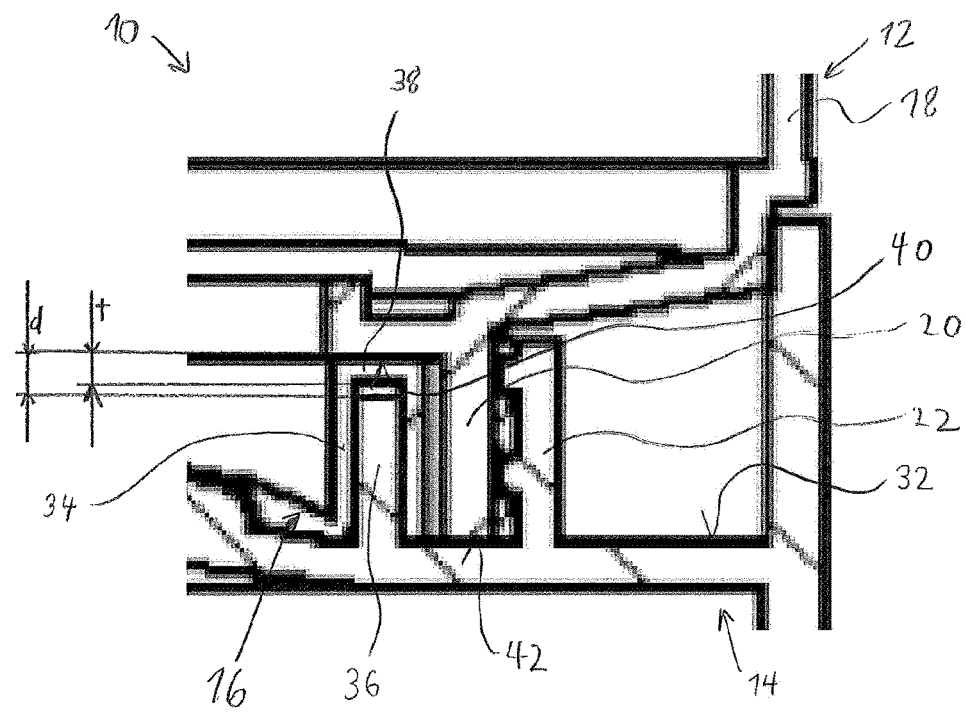

These and other aspects of the invention will be apparent from and elucidated with reference to the embodiments described hereinafter, wherein the described features can constitute each solely or in combination an independent aspect of the invention. In the drawings:

FIG. 1 is a sectional side view of a bowl in a disassembled state,

FIG. 2: is a sectional side view of the bowl of FIG. 1 in an assembled state and FIG. 3: is a detailed view of the bowl of FIG. 2.

The container as illustrated in FIG. 1 designed as a bowl 10 comprises, particularly consists of, a vessel 12, a stand 14 and a flexible diaphragm 16 arranged between the vessel 12 and the stand 14. The vessel comprises a vessel body 18 which is one-piece with a fastening means 20 which can be screwed to a fastening element 22 of the stand 14. The stand is one-piece with a vent 24 comprising an inlet 26 connected to a discharge opening 28 via a discharge channel 30. The discharge opening 28 is located at the top of a convex part of a bottom 32 of the vent 24. The vent 24 and the flexible diaphragm 16 may be loss-proof connected with each other by means of the fastening means 20 to that a, particularly unidirectional, valve 33 is constituted.

The discharge opening 28 can be closed by the flexible diaphragm 16 as illustrated in FIG. 2. When a sufficient pressure is applied to the discharge channel 30 the flexible diaphragm 16 may be lifted from the discharge opening 28 so that a fluid may flow through the discharge opening 28 and windows located in the material of the flexible diaphragm 16 towards the vessel 18, particularly into a measuring cylinder received by a holding collar 34 of the flexible diaphragm 16. The holding collar 34 is releasably press-fitted received by a support collar 36 of the vent 24. A sealing rim 38 protrudes radially outwards from the upper end of the holding collar 34 contacting a sealing surface 40 of the fastening means 20 from below with a spring force. Since the fastening means 20 abuts the bottom 32 of the vent 24 via a stop 42 provided by an axial front face of the fastening means 20 the sealing surface 40 of the fastening means 20 is located such spaced to the support collar 36 that the sealing rim 38 is not clamped between the sealing surface 40 and the support collar 36 and can contact the sealing surface 40 with a defined spring force. An outer collar 44 protrudes downwards from the sealing rim 38 so that a ring-shaped pocket 46 is provided into which the support collar 36 may be inserted.

As illustrated in FIG. 3 a distance d between the sealing surface 40 of the fastening means 20 to the support collar 36 of the vent 24 is larger than an axial thickness t of sealing rim 38 of the flexible diaphragm 16.

The invention claimed is:

1. A valve for a bowl and/or a bottle that receives and/or mixes fluids, the valve comprising:
   a vent for injecting a fluid, wherein the vent comprises an inlet connected to a discharge opening via a discharge channel;
   a flexible diaphragm for covering the discharge opening of the vent, wherein a top surface of the flexible diaphragm and a bottom surface of the flexible diaphragm define a plane of the flexible diaphragm;
   a holding collar, for receiving a measuring cylinder, is provided on a perimeter of the flexible diaphragm and extends outwardly from the plane of the flexible diaphragm; and
   a fastening means for loss-proof receiving the flexible diaphragm between the fastening means and the vent, wherein the fastening means is releasably connected to the vent,
   wherein
   the vent comprises a support collar supporting the holding collar,
   the holding collar comprises a sealing rim protruding mainly radially outwards,
   the sealing rim is arranged between the fastening means and the support collar, and
   the sealing rim, in its entirety, is provided outside the plane of the flexible diaphragm.

2. The valve according to claim 1, wherein the sealing rim provides a spring force for being pressed against the fastening means.

3. The valve according to claim 1, wherein the fastening means comprises a stop face abutting the vent at a relative position, wherein the fastening means is arranged spaced to the support collar in an axial direction of the support collar.

4. The valve according to claim 1, wherein the fastening means comprises a sealing surface pointing to an axial front face of the support collar, wherein the sealing rim of the flexible diaphragm contacts the sealing surface.

5. The valve according to claim 1, wherein the flexible diaphragm comprises an outer collar protruding from the sealing rim towards the vent, wherein the holding collar, the sealing rim and the outer collar constitutes a ring-shaped pocket into which the support collar of the vent is insertable.

6. The valve according to claim 1, wherein the vent comprises a fastening element releasably connected to the fastening means of a screw connection or a snap connection, wherein the fastening means is radially spaced to the flexible diaphragm at least over the height of the support collar.

7. The valve according to claim 1 wherein the holding collar of the flexible diaphragm is releasably press-fitted inserted into the support collar.

8. The valve according to claim 1, wherein the vent comprises a convex bottom forming the discharge opening wherein the flexible diaphragm is pressed between the fastening means and the bottom.

9. A container for receiving and/or mixing fluids, the container comprising:
   a vessel for receiving and/or mixing the fluids, the vessel comprising a rigid vessel body for bordering a use volume;
   a stand adapted to be placed below the vessel for placing the vessel onto a ground; and
   the valve according to claim 1 for injecting a fluid into at least one selected from a measuring cylinder and the use volume.

10. The container according to claim 9, wherein at least one selected from the fastening means is one-piece with the vessel body and the vent is one-piece with the stand.

11. The container according to claim 9, wherein the measuring cylinder is received by the holding collar, in a press-fitted manner.

12. A method for receiving and/or mixing fluids, the method comprising:
    providing the container according to claim 9, wherein the vessel is connected with the stand;
    connecting the vent of the stand with a discharge stem of at least one selected from an aerosol can and a pump dispenser;
    subsequently injecting a fluid of the at least one selected from a aerosol can and a pump dispenser into the vessel via the valve of the container;
    subsequently mixing and/or applying the at least one fluid located inside the vessel,
    subsequently detaching the vessel from the stand and detaching the flexible diaphragm from the vessel and the stand; and
    subsequently cleaning the vessel, the flexible diaphragm and the stand separately from each other.

13. The method according to claim 12 wherein the vessel, the flexible diaphragm and the stand are cleaned at different times and/or different places.

14. A valve for a bowl and/or a bottle that receives and/or mixes fluids, the valve comprising:
    a vent for injecting a fluid, wherein the vent comprises an inlet connected to a discharge opening via a discharge channel;
    a flexible diaphragm for covering the discharge opening of the vent, wherein the flexible diaphragm comprises a holding collar for receiving a measuring cylinder; and
    a fastening means for loss-proof receiving the flexible diaphragm between the fastening means and the vent, wherein the fastening means is releasably connected to the vent, wherein
the vent comprises a support collar supporting the holding collar of the flexible diaphragm,
a ring-shaped pocket is provide on the perimeter of the flexible diaphragm such that the support collar of the vent is insertable therein, and
the ring-shaped pocket is arrangable between the fastening means and the support collar of the vent.

* * * * *